May 5, 1925.

W. K. LEWIS 1,536,612

METHOD OF PRODUCING CARBON BLACK

Filed Feb. 15, 1923

INVENTOR
WARREN K. LEWIS
BY R.D. Trogner.
ATTORNEY

Patented May 5, 1925.

1,536,612

UNITED STATES PATENT OFFICE.

WARREN K. LEWIS, OF NEWTON, MASSACHUSETTS, ASSIGNOR TO THE GOODYEAR TIRE & RUBBER COMPANY, OF AKRON, OHIO, A CORPORATION OF OHIO.

METHOD OF PRODUCING CARBON BLACK.

Application filed February 15, 1923. Serial No. 619,260.

*To all whom it may concern:*

Be it known that I, WARREN K. LEWIS, a citizen of the United States, and resident of Newton, Massachusetts, have invented new and useful Improvements in Methods of Producing Carbon Black, of which the following is a specification.

My invention relates to the production of carbon black by the decomposition of methane or natural gas, and it has, for its object, the provision of a method whereby carbon black of uniformly high quality may be efficiently produced.

My invention is, broadly, a method of producing carbon black from natural gas by thermal decomposition. However, my method differs in certain respects from any method disclosed heretofore. Decomposition of the gas is accomplished by introducing it into a high temperature zone from which the products of decomposition are quickly removed into a cool zone, which may contain an inert gas, serving as a diluent. The products of decomposition are, therefore, maintained in a distributed state whereby the relatively hot carbon particles are not so apt to come into contact with each other and agglomerate or accumulate into larger particles. The inert gas, serving as a diluent, is preferably constantly replaced, not only to afford means of collecting the products of decomposition, but also to maintain the gas at a relatively low temperature.

My invention is not concerned with any particular type of apparatus, but it is more specifically directed to the manner of decomposing the gas and also, to the method of collecting the products of decomposition. However, in order to insure a clear understanding of the invention suitable apparatus is illustrated in the accompanying drawing and described herein.

Figure 1:
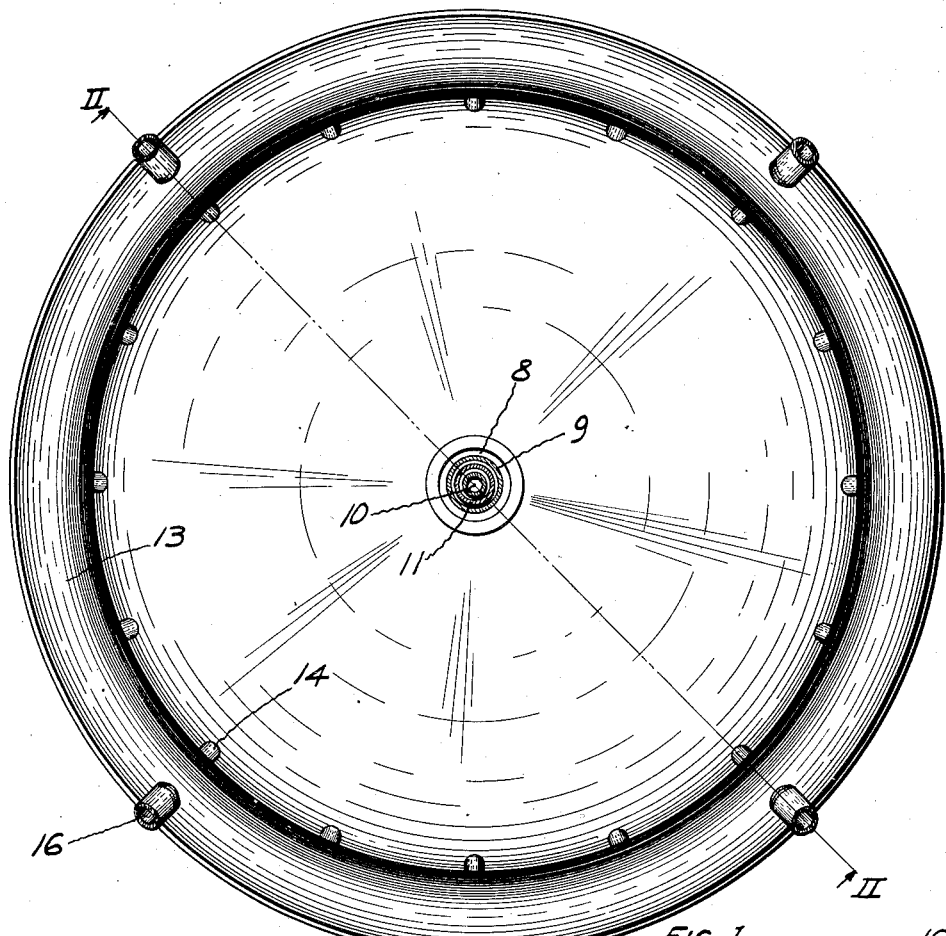
Figure 2:
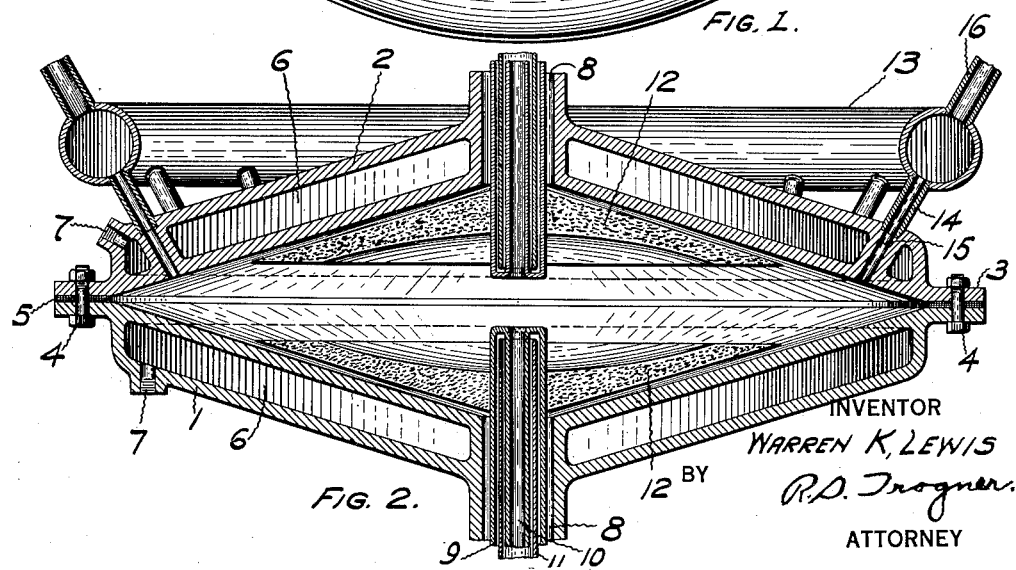

In the drawing Fig. 1 is a side elevational view of a device which may be utilized in producing carbon black in accordance with my invention; and Fig. 2 is a transverse sectional view taken substantially along the line II—II of Fig. 1.

In practicing my invention a hydrocarbon gas, such as natural gas or still gas, may be decomposed to produce carbon black by introducing the gas into the flame of an electric arc. By utilizing an electric arc, the gas may be maintained at a relatively low temperature, at least at a temperature considerably below the critical temperature of decomposition, and suddenly heated sufficiently to decompose it into its elements, carbon and hydrogen. The electric arc may be so inclosed that it may be surrounded by an inert gas, such as hydrogen, which may serve as a diluent for the products of decomposition. A transition of the products of decomposition may be effected by the pressure of gas maintained to feed it into the electric arc. The gas may be continuously decomposed and the resulting products quickly transferred to a relatively cool zone, the carbon particles being distributed therein until they are cooled and collected.

Referring to the drawing, a combustion chamber is provided by utilizing a plurality of frusto-conical shells 1 and 2, having annular flanges 3 secured together by bolts 4, a gasket 5 being interposed between the flanges to insure a gas-tight connection. Each of the shells 1 and 2 is of hollow construction in order to provide a water jacket 6 having communicating openings 7 for the admission and outlet of a cooling fluid, such as water. Each shell also has a centrally located opening 8 adapted to receive a tubular electrode 9, whereby an electric arc may be established. The connections for the electrodes are not shown as it is not believed to be necessary for the understanding of the invention.

As indicated in the drawings, the electrodes are so constructed that a central passage 10 is provided and a tube 11 is disposed within each hollow electrode to permit of forcing a cooling fluid, such as water, into the extremity of the electrode, whereby it may be cooled throughout its entire length. For example water may be forced into the electrode between the tube 11 and the walls of the inner-passage 10 and permitted to flow out between the tube 11 and the outer wall of the electrode. A suitable electrical connection should, of course, be provided in order to establish an arc of high power between the electrodes.

A passageway 8 is provided between each electrode and each of the shells to permit of forcing an inert gas, such as hydrogen into the combustion chamber. A heat-resisting and insulating material 12 is disposed upon the interior face of each shell surrounding the working end of each electrode. A manifold or bustle pipe 13 is connected by a plurality of conduits 14 and passageways 15 to the interior of the combustion chamber, whereby the products of decomposition may be withdrawn from the combustion chamber and collected by means of a plurality of pipes 16 from the manifold. By providing a series of outlet pipes 14 at intervals around the combustion chamber a uniform reduction of pressure within the chamber is made possible.

The practicing of my invention will be apparent from the foregoing description. However, it may be stated that the gas to be decomposed, such as methane or still gas, is admitted to the combustion chamber through the central passageway 10 of each electrode 9, after an arc has been established between the electrodes. The arc should be maintained by a high power source of electrical energy so that it will not be easily disrupted by the passage of the products of decomposition.

It will be seen from the foregoing description that the gas is admitted in a cool state into a high temperature zone where it is heated in the gaseous phase to decompose it. The products of decomposition are transferred immediately to a relatively cool zone, provided, for example, by means of an inert gas also serving as a diluent. The carbon particles that are formed are, consequently, well distributed and do not come into contact with each other while they are still hot, which facilitates the production of a high quality product. The products of decomposition are then removed from the combustion chamber, along with the inert gas supplied thereto, through the passageways 15 and conduits 14 into the manifold 13, where the carbon and hydrogen are collected and afterwards separated. The hydrogen gas may be cooled and returned to the combustion chamber in a complete cycle if desired.

It should be noted that instead of introducing the gas into the interior of a substantially circular arc flame it may be forced through an arc flame in a transverse direction. The condition to be maintained is that the gas be transferred to the arc flame in a relatively cool state and heated therein in its gaseous phase. Moreover, it has been set forth that an inert gas may be utilized to cool the products of decomposition, but other cooling means may be employed. For example, the carbon particles may be caused to contact with a cooled wall or other surface. Such means should be interpreted as within the definition of a "cool zone."

Although I have specifically described a single embodiment of my invention, it will be obvious that minor changes may be made in the method employed and in the apparatus utilized without departing from the scope of my invention, and I desire, therefore, that no limitation shall be imposed except such as are indicated in the appended claims.

What I claim is:

1. A method of producing carbon black that comprises heating a hydrocarbon gas entirely in the gaseous phase in the absence of partial combustion to decompose it, and transferring the products of decomposition into a cool zone.

2. A method of producing carbon black that comprises heating a hydrocarbon gas in the gaseous phase to decompose it, distributing the products of decomposition in an aeriform diluent and collecting and separating the products.

3. A method of producing carbon black that comprises heating a hydrocarbon gas in the gaseous phase to decompose it, distributing the products of decomposition in a cool inert gas and collecting and separating the products.

4. A method of producing carbon black that comprises decomposing a hydrocarbon gas by means of electrical energy, distributing the products of decomposition in an inert gas and removing the products therefrom.

5. A method of producing carbon black that comprises leading methane through a cool passage into a high temperature zone to decompose the gas, effecting immediate transition of the products of decomposition into a cool zone containing an inert gas and removing said products therefrom.

6. A method of producing carbon black that comprises introducing methane into an arc flame, maintaining the gas below the critical temperature of decomposition until heated by the arc, surrounding the arc with a cool inert gas into which the products of decomposition are projected and collecting the products.

7. A method of producing carbon black that comprises establishing a high power electrical arc in a closed chamber, surrounding the arc with a cool inert gas, introducing methane maintained below the critical temperature of decomposition into the arc and collecting the products of decomposition projected into the inert gas.

8. A method of producing carbon black that comprises introducing an aeriform hydrocarbon into a decomposition chamber and maintaining the walls of such chamber at every point at a temperature below the thermal decomposition of a gaseous mixture at that point.

In witness whereof, I have hereunto signed my name in the presence of two subscribing witnesses.

WARREN K. LEWIS.

Witnesses:
 WALTER G. WHITMAN,
 HENRY O. FORREST.